United States Patent Office 2,836,849
Patented June 3, 1958

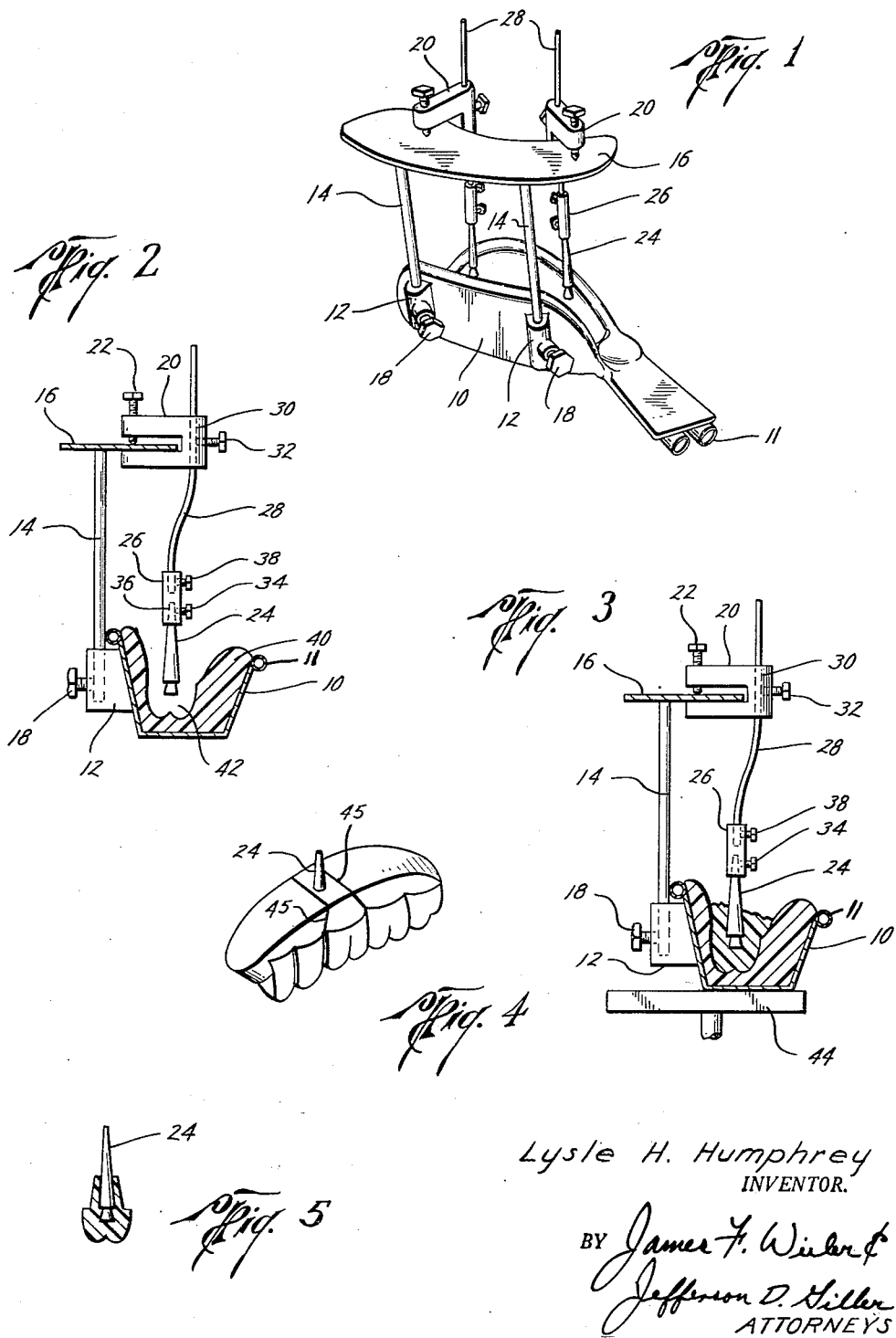

2,836,849

DENTAL APPARATUS

Lysle H. Humphrey, Houston, Tex.

Application March 25, 1955, Serial No. 496,792

5 Claims. (Cl. 18—5.7)

The present invention relates to improved dental apparatus and, more particularly, relates to apparatus for preparing crowns, inlays and bridgework by the so-called impression technique.

It is a practice in making crowns, inlays, bridgework and the like to form an impression of a prepared tooth or teeth which are to be provided with a crown, inlay or bridgework by the use of a dental impression tray which is filled with a suitable impression material, such as wax, Hydrocolloid and the like. The dental impression tray with the impression material is placed in the patient's mouth and results in a negative impression of the prepared tooth or teeth upon which work is to be performed. The impression tray is then removed from the patient's mouth and the negative impressions are filled with a plastic material capable of forming a hard strong solid mass on setting, such as "Duroc," which is an extra hard artificial stone made by mixing water and powder together and permitting it to solidify. This forms a die or replica of the prepared tooth, teeth or area on which work may be performed to make a crown, bridgework or inlay to be applied to the corresponding portion of the patient's mouth.

A dowel pin is placed in the prepared tooth impression or impressions in the plastic material and in order to compact the plastic material in the impression to obtain an accurate die of the prepared tooth or teeth, the impression tray, impression material, and plastic material with the dowel pin are placed upon a vibrator and vibrated.

It is of utmost importance that the dowel pin be centered and disposed on a vertical axis so that when a die of a prepared tooth is cut from the remainder of the set plastic material, the die may readily be removed without binding or injuring the remainder of the formed die. This is a very serious, difficult and time consuming problem in the art inasmuch as it is almost impossible to locate a dowel pin in the center of an impression of a prepared tooth and to locate it in a vertical axis with respect thereto after the plastic material has been placed in the impression. Also, it is virtually impossible to maintain the dowel pin in such a position during compacting of the plastic material by vibrating.

It would be highly advantageous and time saving to provide an apparatus for and a method of preparing replicas or dies of prepared teeth to be worked on in which the dowel pin is centered in the impression thereof on a vertical axis and is maintained in this position while the plastic material is poured and vibrated so that the dowel pin is centered on a vertical axis in the solidified die of the prepared tooth.

It is therefore an object of the present invention to provide an improved means for preparing dies of prepared teeth by the so-called impression technique.

It is yet a further and major object of the present invention to provide a means for accurately aligning and maintaining dowel pins in impressions in a dental impression tray so that the die may be removed from the remainder of the set material and the dowel pin is accurately centered for dental work performed thereon.

Yet a further object of the present invention is the provision of such apparatus by which the dowel pins are maintained in alignment in the plastic material disposed in prepared tooth impressions while the plastic material is compacted in the impression by vibrating and until the plastic material sets.

Yet a further object of the present invention is the provision of such an apparatus by which such improved results are obtained, which apparatus may readily and easily be attached to conventional dental impression trays and which is inexpensive to build, and which is reliably efficient in use.

Yet a further object of the present invention is the provision of such apparatus in which the dowel pins are quickly, easily and readily centered in the dies of the prepared teeth thereby simplifying and speeding up the so-called impression technique for making crowns, inlays and bridgework.

Other and further objects, features, and advantages will be apparent from the following description of a presently preferred apparatus of the invention, given for the purpose of disclosure, and taken in conjunction with the accompanying drawing, where like character references designate like parts throughout the several views, and where Figure 1 is a perspective view illustrating a conventional dental impression tray with an apparatus according to the invention for properly aligning the dowel pins in the impressions formed of prepared teeth in the patient's mouth.

Figure 2 is a side elevation, partly in section, illustrating the dental impression tray and apparatus of Figure 1, Figure 3 is a view similar to that of Figure 2 but illustrates the added step of the impression filled with plastic or stone material and placed on a vibrating tray, Figure 4 illustrates the die or replica after it has been solidified and removed from the dental impression tray, and Figure 5 is a cross-sectional view illustrating the dowel pin embedded in the die or replica so that the die might be worked on in forming the crown, bridge or inlay, as may be the case.

Referring now to the drawing, and particularly to Figures 1 and 2, the reference numeral 10 designates a conventional dental impression tray of the water jacketed type. For example, the cooling water pipes 11 are provided for circulating cooling liquid to aid in setting the elastic or resilient material placed in the tray. Any conventional dental impression tray may be used, whether it is a partial or full dental impression tray.

There are provided a pair of fittings 12 on the dental impression tray 10, which fittings are soldered or otherwise secured thereto and which receive the pair of uprights 14 which extend upwardly and support the guide or plate-like member 16 which generally conforms to the configuration of the dental impression tray 10. The fittings 12 are each supplied with set screws 18 so that the uprights 14 and hence the guide 16 may securely be locked in place or may be removed as will be apparent later. Thus, the uprights 14 and guide member 16 form in effect a frame which is detachably secured to the dental impression tray.

A clamp, such as the U-shaped clamp 20 is slidably and adjustably positioned on the guide member 16 and includes the set screw 22 so that it may adjustably be secured to the guide member 16 for proper positioning of the dowel pin 24. It is noted that the clamps 20 are adjustable both longitudinally and laterally of the guide member 16 which is highly advantageous in centering the dowel pin 24 in proper position as many teeth have their axis at an angle to true vertical.

The dowel pin 24 is received by a fitting 26 which is secured to the lower end of a wire-like member 28 extending through the vertically-disposed aperture 30 in the clamp 20 and which is provided with an additional set screw 32 so that the vertical height of the wire 28, and consequently the dowel pin 24, may be adjusted and locked in position.

Preferably, the wire 28 is of a flexible material, such as aluminum wire, so it may readily be bent for proper positioning of the dowel pin 24. The wire 28 may be expendable and new ones added as necessary. Thus, by adjustment of the position of the clamp 20 longitudinally and laterally on the guide member 16 and by adjustment of the wire 28 and its vertical height, the dowel pin 24 can accurately be centered on a true and centered axis in the impression 42 in the impression mold 40 despite the angle of this axis. This is accomplished easily and readily.

Due to the fact that the plastic material is compacted by vibrating the dental impression tray 10, it is highly desirable to securely lock the dowel pin 24 to the fitting 26, and, for this purpose, a set screw 34 is provided which engages the upper end of the dowel pin 24 when it is placed within the opening 36 in the lower end of the fitting 26. If desired, the lower end of the wire 28 may be secured to the fitting 26 by a similar arrangement, generally indicated by the reference numeral 38 although it may be secured thereto in any desired fashion or may be formed integrally therewith.

The use of the apparatus of my invention is as follows. The dental tray 10 is partially filled with a suitable wax-like or gelatinous material, such as any of the commercially available materials for making impressions, for example, Hydrocolloid to form a flexible mold. The dental impression tray is then placed in the patient's mouth over the area on which work is to be performed so that a negative impression is made of that area and teeth for which a crown, inlay or bridge is to be provided, the teeth having been prepared in advance to receive the crown, bridge or inlay. The wax-like material is then allowed to set. To aid in this, ordinarily ice water is circulated through the jacket of the dental impression tray 10 by means, not shown, in the usual manner. While wax-like material has been mentioned any suitable flexible or resilient or elastic material may be used which is thermally or chemically set.

Of course, when the dental impression tray 10 is placed in the patient's mouth, the frame comprising the uprights 14, guide member 16 and other elements are not on the tray.

After an impression has been taken, the dental impression tray is removed from the patient's mouth and the guide member 16 is secured to the dental impression tray by placing the uprights 14 in the fittings 12 and tightening the set screws 18. Depending upon how many dies or replicas of the teeth to be worked on are to be made, one dowel pin 24 is placed into and held in position in the center and on the axis of each impression, such as illustrated in Figure 2. This is accomplished by placing the clamp 20 directly above the impression 42 in the impression material or mold 40 and securely clamping it into position by adjusting the set screw 22. The wire 28 is raised or lowered, as the case may be, to properly position the dowel pin 24 and the wire may be bent, since it is pliable, so that the dowel pin 24 is centered directly on the axis in the impression 42, the dowel pin 24 having previously been securely placed in the lower end of the fitting 26 by tightening the set screw 34.

In the event there is only one die to be made, it is only necessary to utilize one dowel pin 24, but one or more dies may be made at a time as may be necessary. Thus, for example while two dowel pins and clamps are illustrated in Figure 1, any number may be made at one time as desired.

It is noted that the dowel pin 24 may be perfectly centered before any of the plastic material is placed in the impression 42. It seems obvious that this could not be accomplished with any reliability after the impression 42 is filled with the plastic material. After properly positioning the dowel pin 24, as previously mentioned, the plastic material, such as "Duroc" is placed in the impression 42 in the impression mold 40 and it is compacted by vibrating it on a vibrator, the tray 44 of which is illustrated. It is necessary to vibrate the material so that it is compacted into all the impressions and to avoid entrapment of air so that a perfect replica or die is made of the tooth or teeth upon which dental work is to be performed. It is noted that due to the fact the dowel pin is connected through the fitting 26, wire 28, clamp 20, guide member 16, uprights 14 and fittings 12 to the dental impression tray 10 that it vibrates as a unit therewith thereby insuring that it remains in proper position while being vibrated. This is exceedingly important and critical in order to insure proper centering of the dowel pin 24 and it is to overcome disadvantages of the prior devices and methods in this and other regards that the present invention is directed. The present apparatus insures that the dowel pin 24 remains in proper position so that the dowel pin is centered properly during the vibrating period and is embedded in the hardened plastic material after setting in a true central and properly aligned position.

After the vibrating step, the plastic material is allowed to set and harden with the dowel pin or pins maintained in position. Thereafter the hardened plastic die is removed from the impression tray and the flexible mold removed thereby producing a positive replica or die of the teeth upon which dental work is to be performed, such as illustrated in Figure 4.

The hardened die is then cut, such as by a thin blade saw, along each side of a prepared tooth, such as at 45, see Figure 4, and the dowel pin is pushd out of the die to provide a die of a prepared tooth, such as illustrated in Figure 5. This particular die is thus a replica or positive of the prepared tooth upon which a crown, inlay or bridgework is to be performed. The dowel pin 24 may securely be held in the model or cast while this work is being performed and after completion, the crown, bridge or inlay may be placed into position in the patient's mouth.

If desired, the plastic material may be placed only in the particular impression or impressions 42 of the prepared tooth upon which a crown, bridge or inlay is to be placed. This is allowed to solidify as mentioned and removed from the flexible mold 40. The die of the prepared tooth may then be shaped, as illustrated in Figure 5, and treated with a separating material, such as a grease, and placed back in the impression 42 in the flexible mold 40. Additional plastic material is then placed in the entire mold 40 and permitted to set to form the model or cast for holding the die in a corresponding position to that of the prepared tooth with adjacent teeth in the patient's mouth so that work is performed on the die in this same relationship.

Thus, in both cases, the die is used for the dental work while being held in a cast or mold of the adjacent teeth.

The present apparatus therefore advantageously provides centering and proper alignment of the dowel pin or pins with respect to the proper height and position in the impression or impressions, securely holds the dowel pin or pins in this centered position while the plastic material or stone mix is poured into the impression and while it is being compacted into position by vibrating and during setting so that it is embedded in the hardened die in a centered position.

While presently preferred embodiments have been illustrated for the purpose of disclosure, it will be apparent that numerous changes in parts, arrangement and details of construction may be made within the spirit of the invention. For example, any suitable means may be utilized to attach the frame to the dental impression plate 10 and any type clamping members may be used which may be adjusted on the frame for proper positioning of the dowel pin. Preferably, however, the wire from the clamp to the dowel pin should be flexible and pliable so that the dowel pin 24 may properly be centered and some locking means should be provided for securely holding the dowel pins to the wire so that the dowel pin will not vibrate loose during the vibrating step.

The present invention, therefore, is well suited to carry out the objects and ends and has the advantages mentioned as well as others inherent therein. Accordingly, the present invention is to be limited only by the spirit thereof and the scope of the appended claims.

What is claimed is:

1. Apparatus for making a die from a prepared tooth impression from a mold disposed in a dental impression tray comprising, a frame including a guide member spaced from and generally coextensive with at least a portion of the dental tray, means for detachably locking the frame to the dental impression tray, adjustable clamp means movably disposed on the guide member, a flexible member secured to said clamp means extending downwardly toward said prepared tooth impression, said flexible member being adjustable lengthwise and angularly with respect to the prepared tooth impression, and means at the lower end of the flexible member for detachably locking a dowel pin thereto whereby said dowel pin is supported by said dental tray in adjusted position with respect to said prepared tooth impression.

2. Apparatus for making a die from a prepared tooth impression in a mold disposed in a dental tray comprising, a frame including a guide member spaced from and generally coextensive with at least a portion of the dental tray, means detachably locking the frame to the dental impression tray, a clamp movably disposed on the guide member for adjusted movement therealong, a pliable wire adjustably secured to the clamp and extending downwardly toward the prepared tooth impression, said wire being adjustable toward and away from said prepared tooth impression, and means at the lower end of the wire for detachably locking a dowel pin thereto whereby said dowel pin is supported by said dental tray in adjusted position with respect to said prepared tooth impression.

3. Apparatus for making a die from a prepared tooth impression in a mold and disposed in a dental impression tray comprising, a frame including a pair of spaced uprights, a curved guide plate supported by said spaced uprights, said guide plate being generally coextensive with at least a portion of the dental impression tray, means for detachably locking the pair of spaced uprights to the dental impression tray, a clamp movably disposed on the guide plate for adjusted movement therealong, a pliable wire adjustably secured to the clamp and extending downwardly toward the prepared tooth impression, said wire being adjustable toward and away from said prepared tooth impression, and means at the lower end of the wire for detachably locking a dowel pin thereto whereby said dowel pin is supported by said dental tray in adjusted position with respect to said prepared tooth impression.

4. Apparatus for making a die from a prepared tooth impression comprising, a dental tray for receiving a mold for making a prepared tooth impression therein, a frame including a guide member spaced from and generally coextensive with at least a portion of the dental impression tray, means detachably locking the frame to the dental impression tray, a clamp movably disposed on the guide member for adjusted movement therealong, a pliable wire adjustably secured to the clamp and extending downwardly toward the prepared tooth impression, said wire being adjustable toward and away from said prepared tooth impression, and means at the lower end of the wire for detachably locking a dowel pin thereto whereby said dowel pin is supported by said dental tray in adjusted position with respect to said prepared tooth impression.

5. Apparatus for making a die from a prepared tooth impression comprising, a dental tray for receiving a mold for making a prepared tooth impression therein, a frame including a guide member spaced from and generally coextensive with at least a portion of the dental tray, means detachably locking the frame to the dental impression tray, adjustable clamp means movably disposed on the guide member, a flexible member at the lower end of the clamp means extending downwardly toward said prepared tooth impression, said flexible member being adjustable lengthwise and angularly with respect to the prepared tooth impression, and means at the lower end of the flexible member for detachably locking a dowel pin thereto whereby said dowel pin is supported by said dental tray in adjusted position with respect to said prepared tooth impression.

References Cited in the file of this patent

UNITED STATES PATENTS

| | | |
|---|---|---|
| 2,105,694 | Klomp | Jan. 18, 1938 |
| 2,138,254 | Mink | Nov. 29, 1938 |
| 2,517,802 | Rubissow | Aug. 8, 1950 |
| 2,669,780 | Mann | Feb. 23, 1954 |
| 2,700,219 | Lindley | Jan. 25, 1955 |